(12) United States Patent
Takano et al.

(10) Patent No.: US 8,592,334 B2
(45) Date of Patent: Nov. 26, 2013

(54) DIELECTRIC CERAMIC COMPOSITION AND AN ELECTRONIC COMPONENT

(75) Inventors: Kosuke Takano, Tokyo (JP); Mari Miyauchi, Tokyo (JP); Nobuto Morigasaki, Tokyo (JP); Hideaki Seki, Tokyo (JP); Makoto Maeda, Tokyo (JP); Takahiro Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 280 days.

(21) Appl. No.: 12/385,052

(22) Filed: Mar. 30, 2009

(65) Prior Publication Data

US 2009/0246508 A1 Oct. 1, 2009

(30) Foreign Application Priority Data

Mar. 31, 2008 (JP) .................. 2008-094143

(51) Int. Cl.
*C04B 35/468* (2006.01)
*H01G 4/12* (2006.01)

(52) U.S. Cl.
USPC ........... 501/138; 501/137; 501/139; 428/701; 361/321.4

(58) Field of Classification Search
USPC .................. 428/701, 702; 501/137, 138, 139; 361/321.4; 252/62.3 BT
See application file for complete search history.

(56) References Cited

U.S. PATENT DOCUMENTS

| 6,226,172 B1 | 5/2001 | Sato et al. |
| 6,559,084 B1 * | 5/2003 | Fujikawa et al. ............. 501/139 |
| 6,699,809 B2 | 3/2004 | Fujikawa et al. |
| 6,809,052 B2 * | 10/2004 | Horie et al. .................... 501/138 |
| 2007/0191211 A1 * | 8/2007 | Hosono et al. ................ 501/139 |

FOREIGN PATENT DOCUMENTS

| CN | 1257052 A | 6/2000 |
| JP | B-3039417 | 3/2000 |
| JP | B-3064918 | 5/2000 |
| JP | B-3091192 | 7/2000 |
| JP | A-2001-031467 | 2/2001 |
| JP | A-2007-217205 | 8/2007 |
| KR | A-10-2007-0082049 | * 8/2007 |

* cited by examiner

*Primary Examiner* — Humera Sheikh
*Assistant Examiner* — Scott R Walshon
(74) *Attorney, Agent, or Firm* — Oliff & Berridge, PLC (57) ABSTRACT

A dielectric ceramic composition comprises, a main component including barium titanate, a first subcomponent including MgO, a second subcomponent including sintering aids of $SiO_2$ compound, a third subcomponent including at least one of $V_2O_5$, $Nb_2O_5$ and $WO_3$, a fourth A subcomponent including $R^A$ oxide (note that, $R^A$ is at least one selected from Tb, Gd and Dy), a fourth B subcomponent including $R^B$ oxide (note that, $R^B$ is at least one selected from Ho, Y and Yb), and a fifth subcomponent including MnO or $Cr_2O_3$.

2 Claims, 1 Drawing Sheet

DIELECTRIC CERAMIC COMPOSITION AND AN ELECTRONIC COMPONENT

BACKGROUND OF THE INVENTION

1. Field of the Invention

The present invention relates to a dielectric ceramic composition used as, for example, a dielectric layer of a multilayer ceramic capacitor and the like, and an electronic component using this dielectric ceramic composition as a dielectric layer.

2. Description of the Related Art

A multilayer ceramic capacitor as one example of an electronic component is produced, for example, by alternately stacking a ceramic green sheet composed of a predetermined ceramic composition and an internal electrode layer having predetermined pattern, and cofiring a green chip thus obtained as one body. Since the internal electrode layer of the multilayer ceramic capacitor is formed to be one body with a ceramic dielectric body by firing, it is necessary to select a material which does not react with the ceramic dielectric body. Therefore, as a material to compose the internal electrode layer, conventionally, it has been forced to use expensive rare metal such as platinum, palladium and the like.

However, in recent years, since the dielectric ceramic composition using inexpensive base metals such as nickel, copper and the like has been developed, and significant cost down has been realized.

In recent years, demands for downsizing the electronic components along with the densification of electronic circuits, downsizing and making a larger capacity of the multilayer ceramic capacitor have been progressed rapidly. Along with that, each layer of the dielectric layer of the multilayer ceramic capacitor has become thinner, thus there are demands for the dielectric ceramic composition which can maintain the reliability as a capacitor even when it is made thinner. Particularly, for downsizing and making larger capacity of a mid-voltage capacitor used under high rated voltage, a great reliability is required for the dielectric ceramic composition.

Also, the multilayer ceramic capacitor using the dielectric ceramic composition including barium titanate as a main component showing ferroelectricity is accompanied with an electrostriction which generates a mechanical strain when electrical field is applied. In some cases a vibration noise generated by this electrostriction is in an uncomfortable range for human, thus a countermeasure is required.

Conventionally, as a technology in which the base metal can be used as a material to compose the internal electrode, and temperature change of capacitance is satisfying X7R property (within, −55 to 125° C., ΔC=±15%) of EIA standard, the present applicant has suggested the dielectric ceramic composition disclosed in JP Patent No. 3091192 and the like. However, since capacitance-temperature characteristic is important in this technology, a rare earth element having relatively small ion radius is added more than a rare earth element having large ion radius. Thus, it was insufficient to obtain the high reliability along with the downsizing and larger capacity of the mid-voltage capacitor. Further, there was a problem of electrostriction involved due to large specific dielectric constant which is 2000.

Also, as another technology, dielectric ceramic capacitors disclosed in JP Patent Nos. 3039417 or 3064918 are known.

In such dielectric ceramic capacitors, at least one of rare earth element oxide of Sc and Y and at least one of rare earth element oxide of Gd, Tb and Dy, are added in barium titanate. Namely, the technical art shown in JP Patent No. 3039417 aims to improve the X7R property of EIA standard and a highly accelerated lifetime of an insulation resistance by adding at least two kinds of rare earth element oxides selected from two element groups which is divided arbitrarily, to barium titanate.

However, in the technical art disclosed in JP Patent No. 3039417, since the added amount of the rare earth element is too little or so, the specific dielectric constant is 3000 or more which is large, thus the possibility that electrostriction occurring in a high electric field was high.

Further, in JP Patent No. 3064918, the dielectric ceramic composition wherein pluralities of rare earth elements are added to barium titanate is disclosed. However, in JP Patent No. 3064918, the inventive idea to divide rare earth element by large or small size of the ion radius is not disclosed.

Thus, there is a problem of the electrostriction due to a large specific dielectric constant, as similar to JP Patent No. 3039417.

SUMMARY OF THE INVENTION

A purpose of the present invention is to provide a dielectric ceramic composition having excellent highly accelerated lifetime and a capacitance-temperature characteristic as well as suppressed electrostriction. Also, the present invention aims to provide electronic components such as a highly reliable multilayer ceramic capacitor produced by using such dielectric ceramic composition. In particular, a purpose of the present invention is to provide electronic components such as a mid-voltage multilayer ceramic capacitor having a high rated voltage.

The present inventors have found, as a result of keen examination to achieve the above purposes, that the dielectric ceramic compositions which comprise barium titanate, specific subcomponents, and further comprise specific ratio of rare earth element having large ion radius and rare earth element having small ion radius, is effective to improve good highly accelerated lifetime and a capacitance-temperature characteristic and to suppress the electrostriction, and have reached to accomplished the present invention.

Namely, a dielectric ceramic composition according to the present invention comprises;

a main component including barium titanate, a first subcomponent including MgO, a second subcomponent including sintering aids of $SiO_2$ compound, a third subcomponent including at least one of $V_2O_5$, $Nb_2O_5$ and $WO_3$, a fourth A subcomponent including $R^A$ oxide (note that, $R^A$ is at least one selected from Tb, Gd and Dy), a fourth B subcomponent including $R^B$ oxide (note that, $R^B$ is at least one selected from Ho, Y and Yb), and a fifth subcomponent including MnO or $Cr_2O_3$, wherein;

ratios of the respective subcomponents to 100 mol of said main component are;

| | |
|---|---|
| the first subcomponent: | 1.8 to 3.2 mol, |
| the second subcomponent: | 1 to 4 mol, |
| the third subcomponent: | 0.01 to 0.15 mol, |
| the fourth A subcomponent: | 1.9 to 4 mol, |
| the fourth B subcomponent: | 0.01 to 1 mol, |
| the fifth subcomponent: | 0.05 to 0.7 mol, and in case that mol ratio of said $R^A$ oxide to $R^B$ oxide is shown by $R^A/R^B$, then the ratio is $R^A/R^B > 2$. |

An electronic component according to the present invention is not particularly limited, if it includes the dielectric layer, for example, there is the multilayer ceramic capacitor element having the capacitor element body wherein the dielectric layers and internal electrodes are alternately stacked. In the present invention, said dielectric layer is composed of any one of the above mentioned dielectric ceramic composition. As an conductive material, although it is not particularly limited, for example, Ni or Ni alloy may be mentioned.

Also, the electronic component according to the present invention is suitable for the multilayer ceramic capacitor in which the rated voltage is 16V or more.

A dielectric ceramic composition of the present invention has effects to improve a highly accelerated lifetime, capacitance-temperature characteristic and breakdown voltage characteristic, and to suppress an electrostriction by comprising a specific ratio of rare earth element having large ion radius and rare earth element having small ion radius, and also by maintaining small crystal particle size.

Although the reason for the above is not necessarily clear, it is considered as follows.

In the dielectric ceramic compositions including barium titanate particle, the more the additive such as rare earth element is comprised, the lower the electrostriction becomes.

This is considered that, since the specific dielectric constant is lowered due to the low ratio of the barium titanate in the dielectric ceramic compositions, even when the electric field is applied, it is hard to receive the effect, thus the electrostriction is suppressed.

Also, with respect to the highly accelerated lifetime, the rare earth element having large ion radius shows favorable value, if it is added to the dielectric ceramic composition more than the rare earth element having small ion radius.

It is considered to be caused by a solid dissolving property of the rare earth element to barium titanate.

The rare earth element having small ion radius has large sold dissolving property to barium titanate particle, and it is expected that the rare earth element disperses into the deep portion of the internal portion of barium titanate particle. Therefore, it is considered that segregation of rare earth element, additive elements, particularly, alkaline earth elements are reduced, and thus the reliability such as the highly accelerated lifetime is improved.

However, in case that the rare earth element having large ion radius is included too much, the capacitance-temperature characteristic tends to deteriorate.

Therefore, the present inventors reached to an invention to comprise a large amount of the rare earth element having a large ion radius and adding the rare earth element having a small ion radius to the rare earth element having large ion radius in a specific ratio.

By this method, the rare earth element having a small ion radius is thought to suppress the excess solid dissolving of the rare earth element having the large ion radius.

In the present invention, by adopting such method, it is considered that a dielectric ceramic composition has effects to improve the highly accelerated lifetime, capacitance-temperature characteristic and the dielectric ceramic composition with suppressed electrostriction, by comprising the specific ratio of rare earth element having a large ion radius and the rare earth element having a small ion radius.

DESCRIPTION OF THE PREFERRED EMBODIMENTS

Below, the present invention will be specified based on embodiments shown in drawings.
Multilayer Ceramic Capacitor 1

Figure 1:
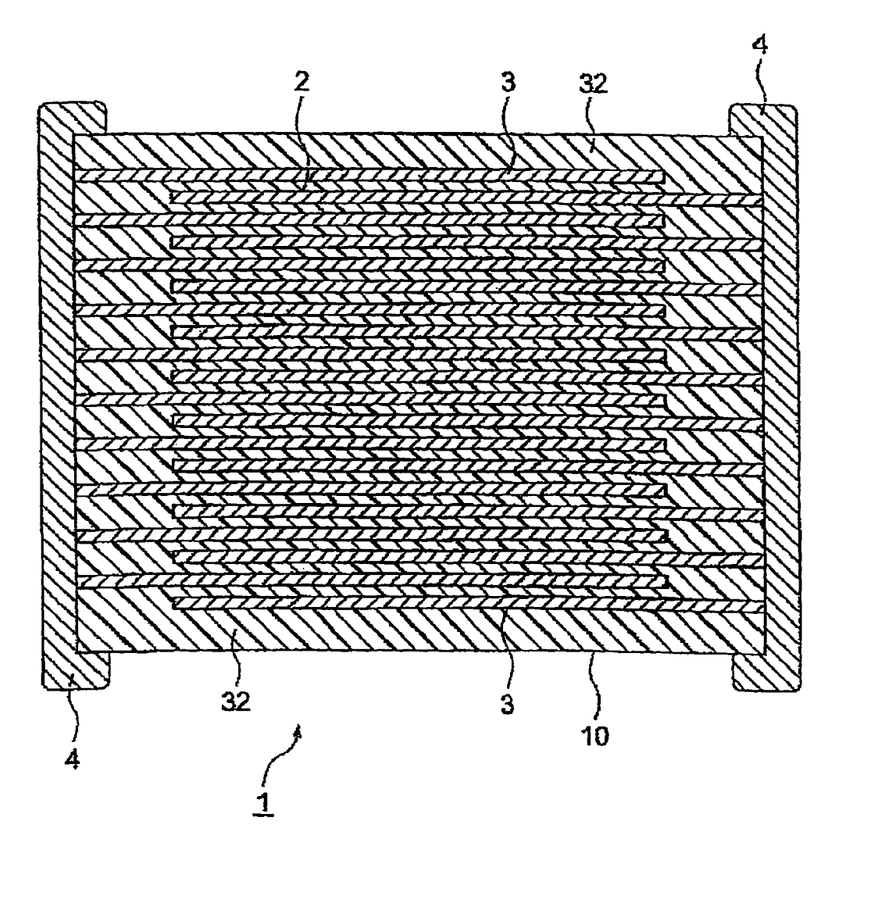
FIG. 1 is across sectional view according to one embodiment of the present invention.

FIG. 1 is a cross sectional view according to one embodiment of the present invention.

As shown in FIG. 1, a multilayer ceramic capacitor 1 according to one embodiment of the present invention comprises a capacitor element body 10 having a constitution wherein dielectric layers 2 and internal electrode layers 3 are alternately stacked. A pair of external electrode 4, which respectively conducts with the internal electrode layers 3 alternately arranged in the element body 10, is formed at both ends of the capacitor element body 10. Although the shape of the capacitor element body 10 is not particularly limited, it is usually a rectangular shape. Further, the size thereof is not particularly limited, although it may be an appropriate size depending on the usage, and usually it is, (0.6 to 5.6 mm)×(0.3 to 5.0 mm)×(0.3 to 1.9 mm) or so.

Although the thickness of the dielectric body 2 can arbitrary changed depending on the capacity design of the capacitor, and in order to exert the effects of the present invention, it is preferably 5 μm or less, particularly 4 μm or less per layer. A lower limit of the thickness is normally 0.5 μm or so. Note that, a number of stacked layers are usually 2 to 1000 or so.

The internal electrode layers 10 are stacked so that each end face expose to a surface of two opposite end portions of the capacitor element body 10. A pair of the external electrodes 4 are formed at both end portions of the capacitor element body 10, and connected with the exposed end face of the alternately arranged internal electrode layers 3 to form a capacitor circuit.

At the both ends of the stacking direction of the multilayer body in which the dielectric layers and the internal electrode layers 3 are alternately stacked, an external layer 32 is layered which is thicker than the dielectric layer 2 and is composed by a dielectric body similar to the dielectric layer 2. The external layer 32 protects the dielectric layer 2 and the internal electrode layer 3 from outside.

A conductive material comprised in the internal electrode layer 3 is not particularly limited, and the base metal may be used since constitutional material of the dielectric layer 2 has resistance to reduction. For the base metal used as the conductive material, Ni or Ni alloy is preferable. As the Ni alloy, an alloy of Ni and one or more kind of element selected from Mn, Cr, Co and Al is preferable, and Ni content of the alloy is preferably 95 wt % or more. Note that, in the Ni or Ni alloy, various kinds of trace component such as P and the like may be included by 0.1 wt % or less or so. A thickness of the internal electrode layer 3 may be determined in response to the usage and the like; however it is usually 0.5 to 5 μm, particularly 0.5 to 2.5 μm or so is preferable.

Although conductive material comprised in the external electrode 4 is not particularly limited, in the present invention, inexpensive Ni, Cu and their alloys may be used. A thickness of the external electrode 4 may be determined according to the usage and the like, however usually 10 to 50 μm is preferable.

The dielectric layer 2 comprises a dielectric ceramic composition of the present invention. The dielectric ceramic composition according to the present invention comprises a main component including barium titanate (preferably shown by a compositional formula $Ba_mTiO_{2+m}$, in which m is $0.995 \le m \le 1.010$, and a ratio of Ba and Ti is $0.995 \le Ba/Ti \le 1.010$).

In the dielectric ceramic composition of the present invention, a ratio of a first subcomponent (MgO) to 100 mol of said main component is 1.8 to 3.2 mol and preferably 2.2 to 2.8 mol.

The first subcomponent has effects to reduce the specific dielectric constant and electrostriction; and if the content of the first subcomponent is too low, such effects become insufficient and tend to raise the electrostriction. Also, if the content of the first subcomponent is too much or too little, the capacitance-temperature characteristic and highly accelerated life time tend to deteriorate.

In the dielectric ceramic composition of the present invention, a ratio of the second subcomponent (sintering aids) to 100 mol of said main component is 1 to 4 mol and preferably 2 to 3 mol. If the content of the second subcomponent is too little, the sintering property tends to deteriorate. If the content of the second subcomponent is too much or too little, the capacitance-temperature characteristic and the highly accelerated lifetime tend to deteriorate.

Said second subcomponent is preferably a sintering aids of $SiO_2$ compound. In this case, it is further preferable that said sintering aids is $(Ba, Ca)_xSiO_{2+x}$ (note that, x=0.8 to 1.2), also known as "BCG". Also, the x in $(Ba, Ca)_xSiO_{2+x}$ is preferably 0.9 to 1.1. When the x is too small, namely when $SiO_2$ is too much, then the dielectric property tends to deteriorate due to the reaction with barium titanate included in the main component. On the other hand, when the x is too large, the sintering property tends to deteriorate since the melting temperature becomes high. Note that, in the second subcomponent, a ratio of Ba and Ca is arbitrary and it may only comprise one of them.

In the dielectric ceramic composition of the present invention, the ratio of the third subcomponent to 100 mol of said main component is 0.01 to 0.15 mol and preferably 0.05 to 0.12 mol. The third subcomponent shows the effect to reduce the electrostriction. When the content of the third subcomponent is too little, such effect becomes insufficient, and the electrostriction tends to rise. Also, if the content of the third subcomponent is too much or too little, the highly accelerated lifetime tends to deteriorate.

Said third subcomponent is one selected from $V_2O_5$, $MoO_3$ and $WO_3$, and it is preferably $V_2O_5$, in view of the highly accelerated lifetime.

In the dielectric ceramic composition of the present invention, the ratio of the fourth A subcomponent ($R^A$ oxide) to 100 mol of said main component is 1.9 to 4 mol and preferably 2.2 to 3.5 mol.

The fourth A subcomponent shows effects to decrease the specific dielectric constant and electrostriction, when the contents of the fourth A subcomponent is too low, such effects become insufficient, and the electrostriction tends to rise. Also, if the content of the fourth A subcomponent is too much or too little, the capacitance-temperature characteristic tends to deteriorate. When the fourth A subcomponent is too much, the highly accelerated lifetime tends to deteriorate.

The $R^A$ of said fourth A subcomponent is at least one selected from Tb, Gd and Dy, and preferably Dy, in view of the temperature property and the highly accelerated lifetime.

In the dielectric ceramic composition of the present invention, the ratio of the fourth B subcomponent (RB oxide) to 100 mol of said main component is 0.01 to 1 mol and preferably 0.05 to 0.5 mol. The fourth B subcomponent shows an effect to decrease the electrostriction. When the content of the fourth B subcomponent is too little, such effect becomes insufficient, and the electrostriction tends to rise. Also, when the content of the fourth B subcomponent is too little, the capacitance-temperature characteristic tends to deteriorate. When the fourth B subcomponent is too much, the highly accelerated lifetime tends to deteriorate.

The $R^B$ of said fourth B subcomponent is at least one selected from Ho, Y and Yb, and preferably Ho, in view of the temperature property and the highly accelerated lifetime.

In the dielectric ceramic composition of the present invention, a ratio of a fifth subcomponent to 100 mol of said main component is 0.05 to 0.7 mol and preferably 0.1 to 0.4 mol. The fifth subcomponent shows effects to decrease the electrostriction and increase the breakdown voltage. When the content of the fifth subcomponent is too little, such effects become insufficient, and the electrostriction tends to rise and the breakdown voltage tend to be reduced. Also, when the content of the fifth subcomponent is too much or too little, the capacitance-temperature characteristic and the highly accelerated lifetime tend to deteriorate.

Said fifth subcomponent is MnO or $Cr_2O_3$, and preferably MnO, in view of the reduction resistance property.

In the dielectric ceramic composition of the present invention, when the mol ratio of the $R^A$ oxide to said $R^B$ oxide is shown as $R^A/R^B$, then $R^A/R^B$ is 2 or more, preferably 5.8 to 56. When $R^A/R^B$ is too low, then the capacitance-temperature characteristic, the highly accelerated lifetime and the electrostriction tend to deteriorate.

In the dielectric ceramic composition of the present invention, an average crystal particle size is 0.2 μm or less, and preferably 0.1 to 0.2 μm. When the crystal particle size is too large, the electrostriction tends to rise, and when it is too small, the capacitance-temperature characteristic, and the highly accelerated lifetime tend to deteriorate.

The particle size of the starting material in the dielectric ceramic composition of the present invention is 0.05 to 0.2 μm, and preferably 0.08 to 0.1 μm.

In the present specification, although the respective oxide to constitute the main and the respective subcomponent are shown by stoichiometric composition, the oxidation state of the oxide may be out of the stoichiometric composition. However, the above ratio of the respective subcomponents is determined in terms of the oxide of the above stoichiometry from the metal content included in the oxide which constitutes the respective subcomponent.

Note that, when at least one of Ca, Sr, Zr and Sn substitutes Ba or Ti of the main component which constitute the perovskite structure, the capacitance-temperature characteristic at 125° C. or higher deteriorates, since Curie temperature shifts to a lower temperature side. Therefore, it is preferable not to use $BaTiO_3$ [for example, $(Ba, Sr)TiO_3$] including these elements, as the main component. However, if it is included as a level of an impurity (0.1 mol % or less of whole dielectric ceramic component), there will be no problem particularly.

Method for Producing the Multilayer Ceramic Capacitor

A multilayer ceramic capacitor using the dielectric ceramic composition of the present invention is produced, as similar to the conventional multilayer ceramic capacitor, by manufacturing the green chip by an ordinary printing method using paste or a sheet method, after firing those, printing or transferring the external electrodes and firing thereof. Below, with respect to a producing method, it will be specified concretely.

First, the dielectric ceramic composition powder included in the dielectric layer paste is prepared, and made into paste to prepare the dielectric layer paste.

The dielectric layer paste may be organic paste kneaded with the dielectric ceramic composition powder and organic vehicle, or it may be water-based paint.

As the dielectric ceramic composition powder, although the above mentioned oxide and the mixture thereof and the composite oxide may be used, other than those, for example, it may be suitably selected from carbonate, oxalate, nitrate, hydroxide, organic metal compound and the like as various compounds which becomes the abovementioned oxide and composite oxide by sintering may be used by blending. The contents of the respective compounds in the dielectric ceramic composition powder may be determined so that it becomes a composition of the above mentioned dielectric ceramic composition after firing.

The particle size of the dielectric ceramic composition powder has average diameter of 0.05 to 0.02 μm or so, before made into a paste.

Note that, in the present embodiment, the subcomponent of the dielectric ceramic composition powder included in the dielectric layer paste may be pre-calcined and added to the main component material after calcining. The subcomponent of the dielectric ceramic composition to be calcined may be all of the first to fifth subcomponents, and it may only be the fourth A or fourth B. Also, the calcine may not be conducted.

The calcine temperature of the above mentioned dielectric ceramic composition powder is preferably 700 to 1100° C.

The organic vehicle is obtained by dissolving the binder in the organic solvent. The binder used for the organic vehicle is not particularly limited, and it may be suitably selected from ordinal various binders, such as ethyl cellulose, polyvinyl butyral and the like. Also, the used organic solvent is not particularly limited, and it may suitably selected from various organic solvents, such as terpineol, butyl carbitol, acetone, toluene and the like, according to the method to be used such as the printing method and the sheet method and the like.

Also, in case that the dielectric layer paste is a water-based paste, the water-based vehicle obtained by dissolving the water soluble binder or the dispersants into water may be kneaded with the dielectric material. The water soluble binder used for the water-based vehicle is not particularly limited, for example, polyvinyl alcohol, cellulose, aqueous acrylic resin and the like may be used.

The internal electrode layer paste is prepared by kneading the conductive material composed of the above mentioned various conductive metal and alloy, or various oxides which becomes the above mentioned conductive material after sintering, the organic metal compounds, the resinate or so with the above mentioned organic vehicle.

The external electrode paste may be prepared as similar to the above mentioned internal electrode layer paste.

The contents of the organic vehicle in the above mentioned respective pates are not particularly limited, and an ordinal content, for example, the binder may be 1 to 5 wt % or so, the solvent is 10 to 50 wt % or so. Also, the additives selected from various dispersants, plasticizer, dielectrics, insulators and the like may be comprised if necessary. A total amount thereof is desirably 10 wt % or less.

When using the printing method, the dielectric layer paste and the internal electrode layer paste are stacked on a substrate such as PET and the like so as to form the layers, and after cutting into predetermined shape, it is detached from the substrate to form the green chip.

Also, when using the sheet method, a green sheet is formed by using the dielectric layer paste, after printing the internal electrode layer paste thereon; these are stacked to form the green chip.

The binder removing process is performed to the green chip before firing. The binder removing process may be determined accordingly depending on the type of the conductive material within the internal electrode paste.

As for the binder removal condition; the temperature rising speed is preferably 5 to 300° C./hour, the holding temperature is preferably 180 to 400° C., and the temperature holding time is preferably 0.5 to 24 hours. Also, the sintering atmosphere is preferably air or reduced atmosphere, and as for the atmospheric gas of the reduced atmosphere it is preferably for example, wet mixed gas of $N_2$ and $H_2$.

The atmosphere when firing the green chip may suitably be determined in response to the type of the conductive material in the internal electrode layer paste, however in case using the base metal such as Ni and Ni alloy and the like as the conductive material, then the oxygen partial pressure at firing atmosphere is preferably $10^{-14}$ to $10^{-12}$ Pa. When the oxygen partial pressure is below the above mentioned range, the conductive material in the internal electrode may break due to the abnormal sintering. Also, when the oxygen partial pressure exceeds the above mentioned range, the internal electrode layer tends to be oxidized.

Also, the holding temperature at the firing is preferably 1100 to 1400° C. When the holding temperature is below the above mentioned range, the densification becomes insufficient, and when it exceeds the above range, the breakage of the electrode due to abnormal sintering of the internal electrode layer, the capacitance-temperature characteristic deterioration and the reduction of the dielectric ceramic composition tend to occur due to the dispersion of the material constituting the internal electrode.

As for other firing conditions, the temperature rising speed is preferably 50 to 1000° C./hour, the temperature holding time is preferably 0.5 to 8 hours, and the cooling speed is preferably 50 to 1000° C./hour. Also, the firing atmosphere is preferably a reduced atmosphere. As the atmospheric gas, for example, the mixed gas of $N_2$ and $H_2$ is preferably wetted to be used.

When firing in the reduced atmosphere, the capacitor element body is preferably annealed. The annealing process is for reoxidation of the dielectric layer, and thereby credibility is improved since IR durability can be elongated extremely.

The oxygen partial pressure in the annealing atmosphere is preferably $10^{-7}$ to $10^{-8}$ Pa. When the oxygen partial pressure is below the above range, it is difficult to reoxidize the dielectric layer, and when it exceeds the above range, the internal electrode layer tends to be oxidized.

The holding temperature at the annealing is 1100° C. or less, and particularly 500 to 1100° C. is preferable. When the holding temperature exceeds the above mentioned range, not only the capacity decreases due to the oxidized internal electrode layer, but also deterioration of the capacitance-temperature characteristic tends to occur since the internal electrode layer reacts with the dielectric base material.

The annealing conditions other than the above are; the temperature holding time preferably of 0 to 20 hours, the cooling speed preferably of 50 to 500° C./hour. Also, as for the atmospheric gas of the annealing, for example, preferably the wet $N_2$ gas and the like is used.

In the above mentioned binder removing process, the firing and the annealing, in order to wet the $N_2$ gas and the mixed gas or so, for example, an wetter and the like may be used. In this case, water temperature is preferably 5 to 75° C. or so.

The binder removing process, the firing and the annealing may be performed continuously or individually.

The multilayer ceramic capacitor of the present invention produced by this manner is mounted on the print circuit board and the like by soldering and the like to be used in various electronic devices and the like.

In the above, although the embodiments of the present invention have been specified, the present invention is not limited to these embodiments at all, and of course it can be worked in various aspects within the scope of the present invention.

For example, in the above mentioned embodiments, the multilayer ceramic capacitor has been exemplified as an electronic component according to the present invention, however, as an electronic component according to the present invention, it is not limited to the multilayer ceramic capacitor, it may be anything if it comprises a dielectric layer composed by the above mentioned dielectric ceramic composition.

Example 1

Below, the present invention will be specified based on further detailed example, however, the present invention is not limited thereto.

Example 1

The main component starting material and subcomponent starting material each having 0.05 to 0.2 μm particle size were prepared. Carbonate was used for the starting material of MgO and MnO; and oxides were used for the other starting materials. Also, $(Ba_{0.6}Ca_{0.4})SiO_3$ was used as the starting material for a second subcomponent. $(Ba_{0.6}Ca_{0.4})SiO_3$ was produced by blending $BaCO_3$, $CaCO_3$ and $SiO_2$ at a ratio of 3:2:5, and wet-mixed for 10 to 24 hours by a ball mill, then dried, firing at 1150° C. in the air, and wet-pulverized for 50 to 100 hours by the ball mill. These starting materials were blended so that the compositional ratio after firing becomes as shown in Table 1, and were wet-mixed by the ball mill for 10 to 24 hours to obtain the dielectric starting material.

The starting material particle size and contents of the main component starting material and the subcomponent starting material of each sample is shown in Table 1 and Table 2. Note that, the starting material particle size was calculated from a specific surface area.

100 parts by weight of the obtained dielectric starting material, 3 to 6 parts by weight of butyral resin, 30 to 50 parts by weight of propanol and 10 to 30 parts by weight of xylene were blended by the ball mill to form the paste, and the dielectric layer paste was obtained.

100 parts by weight of Ni particle having an average particle size of 0.2 to 0.8 μm, 30 to 50 parts by weight of organic vehicle and 5 to 15 parts by weight of butyl carbitol were kneaded by triple rolls to form the paste, and the internal electrode paste was obtained.

A green sheet was formed on a PET film by using the obtained dielectric layer paste. After printing the internal electrode paste thereon, a sheet was removed. Next, these green sheets and green sheets for a protection (internal electrode paste is not printed) were stacked and pressure bonded to obtain a green chip.

Next, the green chip were cut into a predetermined size, then the binder removing process, firing and annealing were performed under following condition to obtain a multilayer ceramic fired body.

The condition for the binder removing process was the temperature rising speed: 25 to 50° C./hour, the holding temperature: 220 to 300° C., the temperature holding time: 5 to 10 hours, and the atmosphere: air.

As for the firing condition, the temperature rising speed: 200 to 600° C./hour, the holding temperature: 1220 to 1300° C., the temperature holding time: 2 hours, cooling speed: 200 to 600° C./hour, atmospheric gas: wet mixed gas of $N_2+H_2$ (oxygen partial pressure: $10^{-13}$ Pa).

As for the annealing condition, the holding temperature: 900 to 1100° C., the temperature holding time: 1 to 5 hours, the cooling speed: 100 to 300° C./hour, the atmospheric gas: wet $N_2$ gas (oxygen partial pressure: $10^{-7}$ Pa). Note that, for wetting the atmospheric gas at firing and annealing, an wetter wherein water temperature of 10 to 35° C. was used.

Next, after polishing the end faces of the obtained multilayer ceramic fired body by sand blast, In—Ga was coated as external electrodes and the sample of the multilayer ceramic capacitor shown in FIG. 1 was obtained.

The size of the obtained capacitor sample was 3.2 mm×1.6 mm×0.6 mm, numbers of the dielectric layer sandwiched between the internal electrodes were 4, a thickness per 1 layer of the dielectric layer (a thickness between layers) was about 3 μm, a thickness of the internal electrode was 1.0 μm. Results of the evaluation of the following properties regarding each sample are shown in Table 1 to Table 4.

Note that, Table 3 is rearranged from the result of each sample of Tables 1 and 2 in order to compare the content of MnO. Tables 4 and 5 are made rearranged from the result of each sample of Tables 1 and 2 in order to compare the content of the sintering aids. The sample number of Table 1 and Table 2 corresponds to Table 3 and Table 4.

Specific Dielectric Constant (∈s)

For the capacitor samples, at a reference temperature of 25° C., the capacitance was measured by a digital LCR meter (YHP 4284A) under the condition of 1 kHz frequency, the input signal level (measured voltage) of 1Vrms. Then, the specific dielectric constant ∈s (no unit) was calculated.

Temperature Characteristic of Capacitance

For the capacitor samples, the capacitance was measured by the digital LCR meter (YHP 4274A), under the condition of 1 kHz frequency, the input signal level (measured voltage) of 1Vrms, when the reference temperature is 25° C., within a temperature range −55° C. to 125° C., the capacitance changing rate (ΔC/C) was inspected whether it satisfies X7R property of EIA standard, when it satisfied it was referred as OK, when it did not satisfied then it was referred as NG.

Highly Accelerated Lifetime (Accelerated Lifetime of Insulation Resistance)

For the capacitor samples, the highly accelerated lifetime was measured by maintaining the condition of applying direct voltage 48V/μm at 185° C. This highly accelerated lifetime is very important when thinning the dielectric layer. In the present embodiment, the time from beginning of application till the resistance drops by one digit was defined as duration, and this was performed to 10 capacitor samples and an average duration time was calculated. In the present embodiment, 20 hours or longer was considered good.

Breakdown Voltage

For the capacitor samples, the direct voltage was applied under the temperature rising speed of 100V/sec to detect 10 mA of the leakage current, or the voltage (breakdown voltage, unit is V/μm) of element at the breakdown was measured. In the present embodiment, the breakdown voltage was an average value measured by using 10 capacitor samples. In the present embodiment, 200V/μm or more was considered good.

Electrostriction by Voltage Application

At first, the capacitor sample was fixed to the glass epoxy substrate, to which an electrode with predetermined pattern was printed, by soldering. Then, the voltage was applied to the samples fixed to the substrate under the condition of AC: 10Vrms/μm, and the frequency: 3 kHz, then the oscillation amplitude of the capacitor sample surface when the voltage was applied was measured followed by calculating the change [ppm] per one layer, to obtain the electrostriction amount.

Note that, for measuring the oscillation amplitude of the capacitor sample surface, a laser doppler vibrometer was used. Also, in the present embodiment, an average value of the measured values using 10 capacitor samples was defined as the electrostriction amount. In the present embodiment, 50 ppm or less was considered good.

Average Crystal Particle Size of the Dielectric Particle

As the measuring method for the average crystal particle size of the dielectric particle, firstly, the obtained capacitor sample was cut along the face vertical to the internal electrode, and the face being cut was polished. Then, the chemical etching was performed to the polished face, then, observed by a scanning electron microscope (SEM), the shape of the dielectric particle was calculated by a code method assuming that the shape was a sphere.

TABLE 1

| No | satrting material particle diameter [μm] | crystal particle diameter [μm] | BaTiO$_3$ contents [mol] | R$^A$ oxide kind | R$^A$ oxide contents [mol] | R$^B$ oxide kind | R$^B$ oxide contents [mol] | MnO contents [mol] | MgO contents [mol] | V$_2$O$_5$ contents [mol] |
|---|---|---|---|---|---|---|---|---|---|---|
| *1 | 0.11 | 0.17 | 100 | Dy2 | *1.8 | Ho2 | 0.05 | 0.17 | 2.8 | 0.1 |
| 2 | 0.12 | 0.16 | 100 | Dy2 | 2.0 | Ho2 | 0.05 | 0.17 | 2.7 | 0.10 |
| 3 | 0.11 | 0.15 | 100 | Dy2 | 2.4 | Ho2 | 0.05 | 0.17 | 2.7 | 0.10 |
| 4 | 0.10 | 0.14 | 100 | Dy2 | 2.8 | Ho2 | 0.05 | 0.17 | 2.7 | 0.10 |
| 5 | 0.08 | 0.13 | 100 | Dy2 | 3.2 | Ho2 | 0.05 | 0.2 | 2.7 | 0.10 |
| 6 | 0.10 | 0.14 | 100 | Dy2 | 3.8 | Ho2 | 0.05 | 0.17 | 2.7 | 0.10 |
| 7 | 0.11 | 0.15 | 100 | Dy2 | 4.0 | Ho2 | 0.05 | 0.23 | 2.7 | 0.10 |
| *8 | 0.12 | 0.19 | 100 | Dy2 | *4.2 | Ho2 | 0.05 | 0.16 | 2.8 | 0.10 |
| *9 | 0.09 | 0.17 | 100 | Dy2 | 2.5 | Ho2 | *0.00 | 0.17 | 2.9 | 0.10 |
| 10 | 0.12 | 0.17 | 100 | Dy2 | 2.6 | Ho2 | 0.01 | 0.17 | 2.7 | 0.10 |
| 11 | 0.11 | 0.16 | 100 | Dy2 | 2.6 | Ho2 | 0.07 | 0.17 | 2.7 | 0.10 |
| 12 | 0.10 | 0.18 | 100 | Dy2 | 2.6 | Ho2 | 0.20 | 0.10 | 2.7 | 0.10 |
| 13 | 0.08 | 0.16 | 100 | Dy2 | 2.6 | Ho2 | 0.60 | 0.17 | 2.7 | 0.10 |
| 14 | 0.10 | 0.14 | 100 | Dy2 | 2.6 | Ho2 | 0.80 | 0.05 | 2.7 | 0.10 |
| 15 | 0.11 | 0.13 | 100 | Dy2 | 2.6 | Ho2 | 1.00 | 0.17 | 2.7 | 0.10 |
| *16 | 0.10 | 0.16 | 100 | Dy2 | 2.6 | Ho2 | *2.00 | 0.32 | 2.9 | 0.10 |
| *17 | 0.13 | 0.19 | 100 | Dy2 | 2.5 | Ho2 | 0.10 | *0.01 | 2.6 | 0.05 |
| *18 | 0.15 | 0.19 | 100 | Dy2 | 2.5 | Ho2 | 0.10 | *0.8 | 2.6 | 0.05 |
| *19 | 0.10 | *0.30 | 100 | Dy2 | 2.3 | Ho2 | 0.01 | 0.17 | *1.5 | 0.04 |
| 20 | 0.08 | 0.20 | 100 | Dy2 | 2.6 | Ho2 | 0.06 | 0.17 | 1.8 | 0.10 |
| 21 | 0.08 | 0.20 | 100 | Dy2 | 2.6 | Ho2 | 0.06 | 0.17 | 2.0 | 0.10 |
| 22 | 0.11 | 0.19 | 100 | Dy2 | 2.6 | Ho2 | 0.06 | 0.3 | 2.2 | 0.10 |
| 23 | 0.10 | 0.17 | 100 | Dy2 | 2.6 | Ho2 | 0.06 | 0.17 | 2.4 | 0.10 |
| 24 | 0.08 | 0.16 | 100 | Dy2 | 2.6 | Ho2 | 0.06 | 0.34 | 2.6 | 0.10 |
| 25 | 0.07 | 0.14 | 100 | Dy2 | 2.6 | Ho2 | 0.06 | 0.17 | 2.8 | 0.10 |
| 26 | 0.05 | 0.10 | 100 | Dy2 | 2.6 | Ho2 | 0.06 | 0.70 | 3.2 | 0.10 |
| *27 | 0.11 | 0.15 | 100 | Dy2 | 2.3 | Ho2 | 0.01 | 0.2 | *3.5 | 0.04 |

| No | sintering aids kind | sintering aids contents [mol] | R$^A$/R$^B$ | dielectric constant ($\epsilon$ s) | temperature characteristic (X7R) | highly accelerated lifetime [h] | breakdown voltage [V/μm] | electrostriction [ppm] |
|---|---|---|---|---|---|---|---|---|
| *1 | BCG | 2.55 | 36.0 | 1200 | NG | 23.2 | 227 | 49 |
| 2 | BCG | 2.5 | 40.0 | 1050 | OK | 28.0 | 262 | 41 |
| 3 | BCG | 2.55 | 48.0 | 900 | OK | 32.3 | 259 | 33 |
| 4 | BCG | 2.55 | 56.0 | 920 | OK | 30.1 | 251 | 34 |
| 5 | BCG | 2.7 | 64.0 | 900 | OK | 25.8 | 265 | 33 |
| 6 | BCG | 2.55 | 76.0 | 880 | OK | 23.7 | 264 | 32 |
| 7 | BCG | 3 | 80.0 | 850 | OK | 21.5 | 260 | 31 |
| *8 | BCG | 2.55 | 84.0 | 810 | NG | *18.9 | 219 | 29 |
| *9 | BCG | 3.6 | *0.0 | 910 | NG | 23.7 | 245 | 34 |
| 10 | BCG | 1.00 | #### | 920 | OK | 25.0 | 230 | 34 |
| 11 | BCG | 2.55 | 37.1 | 910 | OK | 28.0 | 241 | 34 |
| 12 | BCG | 2.55 | 13.0 | 900 | OK | 30.1 | 220 | 33 |
| 13 | BCG | 2.30 | 4.3 | 885 | OK | 25.8 | 241 | 32 |
| 14 | BCG | 2.55 | 3.3 | 870 | OK | 28.0 | 251 | 32 |
| 15 | BCG | 2.55 | 2.6 | 860 | OK | 30.1 | 252 | 31 |
| *16 | BCG | 2.55 | *1.3 | 750 | OK | *15.2 | 256 | 26 |
| *17 | BCG | 3.1 | 25.0 | 910 | NG | *6.5 | 221 | 34 |
| *18 | BCG | 2.55 | 25.0 | 920 | NG | *6.5 | 215 | 34 |
| *19 | BCG | 2.55 | #### | 1700 | NG | *8.6 | *150 | *74 |
| 20 | BCG | 2.00 | 43.3 | 1200 | OK | 20.2 | 210 | 49 |
| 21 | BCG | 2.00 | 43.3 | 1200 | OK | 21.5 | 210 | 49 |
| 22 | BCG | 2.55 | 43.3 | 1150 | OK | 23.7 | 217 | 46 |
| 23 | BCG | 2.55 | 43.3 | 1000 | OK | 30.1 | 234 | 38 |
| 24 | BCG | 2.40 | 43.3 | 920 | OK | 32.3 | 241 | 34 |

TABLE 1-continued

| 25 | BCG | 2.55 | 43.3 | 890 | OK | 25.8 | 261 | 33 |
| 26 | BCG | 4.00 | 43.3 | 850 | OK | 23.7 | 270 | 31 |
| *27 | BCG | 2.55 | #### | 800 | NG | *6.5 | 261 | 28 |

TABLE 2

| No | starting material particle diameter [μm] | crystal particle diameter [μm] | BaTiO$_3$ contents [mol] | R$^A$ oxide kind | R$^A$ oxide contents [mol] | R$^B$ oxide kind | R$^B$ oxide contents [mol] | MnO contents [mol] | MgO contents [mol] | V$_2$O$_5$ contents [mol] |
| --- | --- | --- | --- | --- | --- | --- | --- | --- | --- | --- |
| *28 | 0.12 | 0.17 | 100 | Dy2 | 2.7 | Ho2 | 0.05 | 0.24 | 2.6 | *0.00 |
| 29 | 0.11 | 0.16 | 100 | Dy2 | 2.3 | Ho2 | 0.40 | 0.17 | 2.8 | 0.01 |
| 30 | 0.12 | 0.17 | 100 | Dy2 | 2.3 | Ho2 | 0.40 | 0.36 | 2.8 | 0.05 |
| 31 | 0.13 | 0.18 | 100 | Dy2 | 2.4 | Ho2 | 0.40 | 0.17 | 2.8 | 0.10 |
| 32 | 0.08 | 0.13 | 100 | Dy2 | 2.6 | Ho2 | 0.06 | 0.2 | 2.8 | 0.14 |
| *33 | 0.12 | 0.18 | 100 | Dy2 | 2.7 | Ho2 | 0.05 | 0.17 | 2.6 | *0.20 |
| *34 | 0.09 | 0.17 | 100 | Dy2 | 2.4 | Ho2 | 0.05 | 0.17 | 2.5 | 0.05 |
| *35 | 0.10 | 0.18 | 100 | Dy2 | 2.4 | Ho2 | 0.05 | 0.23 | 2.5 | 0.05 |
| 36 | 0.09 | 0.17 | 100 | Dy2 | 2.3 | Ho2 | 0.40 | 0.19 | 2.8 | 0.15 |
| *37 | 0.11 | 0.19 | 100 | Dy2 | 3.1 | Ho2 | 0.10 | 0.2 | 2.7 | 0.05 |
| 38 | 0.12 | 0.17 | 100 | Tb2 | 2.8 | Ho2 | 0.07 | 0.1 | 2.8 | 0.05 |
| 39 | 0.11 | 0.15 | 100 | Gd2 | 2.8 | Ho2 | 0.07 | 0.12 | 2.8 | 0.05 |
| 40 | 0.09 | 0.17 | 100 | Dy2 | 2.8 | Y2 | 0.07 | 0.31 | 2.8 | 0.05 |
| 41 | 0.11 | 0.17 | 100 | Dy2 | 2.8 | Yb2 | 0.07 | 0.17 | 2.8 | 0.05 |
| *42 | 0.20 | *0.25 | 100 | Dy2 | 2.4 | Ho2 | 0.05 | 0.17 | 2.6 | 0.05 |
| *43 | 0.06 | *0.09 | 100 | Dy2 | 2.4 | Ho2 | 0.05 | 0.17 | 2.5 | 0.05 |

| No | sintering aids kind | sintering aids contents [mol] | R$^A$/R$^B$ | dielectric constant (εs) | temperature characteristic (X7R) | highly accelerated lifetime [h] | breakdown voltage [V/μm] | electrostriction [ppm] |
| --- | --- | --- | --- | --- | --- | --- | --- | --- |
| *28 | BCG | 3.6 | 54.0 | 1000 | OK | *4.3 | 255 | 38 |
| 29 | BCG | 2.55 | 5.8 | 1010 | OK | 23.7 | 255 | 39 |
| 30 | BCG | 2.4 | 5.8 | 1000 | OK | 25.8 | 251 | 38 |
| 31 | BCG | 3.5 | 6.0 | 970 | OK | 32.3 | 241 | 37 |
| 32 | BCG | 2.55 | 43.3 | 890 | OK | 25.8 | 253 | 33 |
| *33 | BCG | 2.55 | 54.0 | 800 | OK | *6.5 | 241 | 28 |
| *34 | BCG | *0.80 | 48.0 | 800 | NG | *4.3 | 235 | 28 |
| *35 | BCG | *5.00 | 48.0 | 700 | NG | *8.6 | 220 | 23 |
| 36 | SiO2 | 2.00 | 5.8 | 1050 | OK | 28.0 | 241 | 41 |
| *37 | *Li2O | 2.55 | 31.0 | 910 | NG | *1.0 | 200 | 33.72 |
| 38 | BCG | 2.55 | 40.0 | 900 | OK | 30.1 | 237 | 33 |
| 39 | BCG | 3.2 | 40.0 | 910 | OK | 28.0 | 231 | 34 |
| 40 | BCG | 2.55 | 40.0 | 920 | OK | 23.7 | 232 | 34 |
| 41 | BCG | 2.55 | 40.0 | 930 | OK | 21.5 | 230 | 35 |
| *42 | BCG | 2.55 | 48.0 | 1800 | NG | *8.6 | *180 | *79 |
| *43 | BCG | 2.55 | 48.0 | 500 | NG | *8.6 | 271 | 13 |

TABLE 3

| No | starting material particle diameter [μm] | crystal particle diameter [μm] | BaTiO$_3$ contents [mol] | R$^A$ oxide kind | R$^A$ oxide contents [mol] | R$^B$ oxide kind | R$^B$ oxide contents [mol] | MnO contents [mol] | MgO contents [mol] | V$_2$O$_5$ contents [mol] |
| --- | --- | --- | --- | --- | --- | --- | --- | --- | --- | --- |
| *17 | 0.13 | 0.19 | 100 | Dy2 | 2.5 | Ho2 | 0.10 | *0.01 | 2.6 | 0.05 |
| 14 | 0.10 | 0.14 | 100 | Dy2 | 2.6 | Ho2 | 0.80 | 0.05 | 2.7 | 0.10 |
| 12 | 0.10 | 0.18 | 100 | Dy2 | 2.6 | Ho2 | 0.20 | 0.10 | 2.7 | 0.10 |
| 2 | 0.12 | 0.16 | 100 | Dy2 | 2.0 | Ho2 | 0.05 | 0.17 | 2.7 | 0.10 |
| 3 | 0.11 | 0.15 | 100 | Dy2 | 2.4 | Ho2 | 0.05 | 0.17 | 2.7 | 0.10 |
| 4 | 0.10 | 0.14 | 100 | Dy2 | 2.8 | Ho2 | 0.05 | 0.17 | 2.7 | 0.10 |
| 6 | 0.10 | 0.14 | 100 | Dy2 | 3.8 | Ho2 | 0.05 | 0.17 | 2.7 | 0.10 |
| 10 | 0.12 | 0.17 | 100 | Dy2 | 2.6 | Ho2 | 0.01 | 0.17 | 2.7 | 0.10 |
| 11 | 0.11 | 0.16 | 100 | Dy2 | 2.6 | Ho2 | 0.07 | 0.17 | 2.7 | 0.10 |
| 13 | 0.08 | 0.16 | 100 | Dy2 | 2.6 | Ho2 | 0.60 | 0.17 | 2.7 | 0.10 |
| 15 | 0.11 | 0.13 | 100 | Dy2 | 2.6 | Ho2 | 1.00 | 0.17 | 2.7 | 0.10 |

TABLE 3-continued

| No | | | | | | | | | | |
|---|---|---|---|---|---|---|---|---|---|---|
| 20 | 0.08 | 0.20 | 100 | Dy2 | 2.6 | Ho2 | 0.06 | 0.17 | 1.8 | 0.10 |
| 21 | 0.08 | 0.20 | 100 | Dy2 | 2.6 | Ho2 | 0.06 | 0.17 | 2.0 | 0.10 |
| 23 | 0.10 | 0.17 | 100 | Dy2 | 2.6 | Ho2 | 0.06 | 0.17 | 2.4 | 0.10 |
| 25 | 0.07 | 0.14 | 100 | Dy2 | 2.6 | Ho2 | 0.06 | 0.17 | 2.8 | 0.10 |
| 29 | 0.11 | 0.16 | 100 | Dy2 | 2.3 | Ho2 | 0.40 | 0.17 | 2.8 | 0.01 |
| 31 | 0.13 | 0.18 | 100 | Dy2 | 2.4 | Ho2 | 0.40 | 0.17 | 2.8 | 0.10 |
| 5 | 0.08 | 0.13 | 100 | Dy2 | 3.2 | Ho2 | 0.05 | 0.2 | 2.7 | 0.10 |
| 32 | 0.08 | 0.13 | 100 | Dy2 | 2.6 | Ho2 | 0.06 | 0.2 | 2.8 | 0.14 |
| 7 | 0.11 | 0.15 | 100 | Dy2 | 4.0 | Ho2 | 0.05 | 0.23 | 2.7 | 0.10 |
| 22 | 0.11 | 0.19 | 100 | Dy2 | 2.6 | Ho2 | 0.06 | 0.3 | 2.2 | 0.10 |
| 24 | 0.08 | 0.16 | 100 | Dy2 | 2.6 | Ho2 | 0.06 | 0.34 | 2.6 | 0.10 |
| 30 | 0.12 | 0.17 | 100 | Dy2 | 2.3 | Ho2 | 0.40 | 0.36 | 2.8 | 0.05 |
| 26 | 0.05 | 0.10 | 100 | Dy2 | 2.6 | Ho2 | 0.06 | 0.70 | 3.2 | 0.10 |
| *18 | 0.15 | 0.19 | 100 | Dy2 | 2.5 | Ho2 | 0.10 | *0.8 | 2.6 | 0.05 |

| No | sintering aids kind | contents [mol] | $R^A/R^B$ | dielectric constant ($\epsilon$ s) | temperature characteristic (X7R) | highly accelerated lifetime [h] | breakdown voltage [V/μm] | electrostriction [ppm] |
|---|---|---|---|---|---|---|---|---|
| *17 | BCG | 3.1 | 25.0 | 910 | NG | *6.5 | 221 | 34 |
| 14 | BCG | 2.55 | 3.3 | 870 | OK | 28.0 | 251 | 32 |
| 12 | BCG | 2.55 | 13.0 | 900 | OK | 30.1 | 220 | 33 |
| 2 | BCG | 2.5 | 40.0 | 1050 | OK | 28.0 | 262 | 41 |
| 3 | BCG | 2.55 | 48.0 | 900 | OK | 32.3 | 259 | 33 |
| 4 | BCG | 2.55 | 56.0 | 920 | OK | 30.1 | 251 | 34 |
| 6 | BCG | 2.55 | 76.0 | 880 | OK | 23.7 | 264 | 32 |
| 10 | BCG | 1.00 | #### | 920 | OK | 25.0 | 230 | 34 |
| 11 | BCG | 2.55 | 37.1 | 910 | OK | 28.0 | 241 | 34 |
| 13 | BCG | 2.30 | 4.3 | 885 | OK | 25.8 | 241 | 32 |
| 15 | BCG | 2.55 | 2.6 | 860 | OK | 30.1 | 252 | 31 |
| 20 | BCG | 2.00 | 43.3 | 1200 | OK | 20.2 | 210 | 49 |
| 21 | BCG | 2.00 | 43.3 | 1200 | OK | 21.5 | 210 | 49 |
| 23 | BCG | 2.55 | 43.3 | 1000 | OK | 30.1 | 234 | 38 |
| 25 | BCG | 2.55 | 43.3 | 890 | OK | 25.8 | 261 | 33 |
| 29 | BCG | 2.55 | 5.8 | 1010 | OK | 23.7 | 255 | 39 |
| 31 | BCG | 3.5 | 6.0 | 970 | OK | 32.3 | 241 | 37 |
| 5 | BCG | 2.7 | 64.0 | 900 | OK | 25.8 | 265 | 33 |
| 32 | BCG | 2.55 | 43.3 | 890 | OK | 25.8 | 253 | 33 |
| 7 | BCG | 3 | 80.0 | 850 | OK | 21.5 | 260 | 31 |
| 22 | BCG | 2.55 | 43.3 | 1150 | OK | 23.7 | 217 | 46 |
| 24 | BCG | 2.40 | 43.3 | 920 | OK | 32.3 | 241 | 34 |
| 30 | BCG | 2.4 | 5.8 | 1000 | OK | 25.8 | 251 | 38 |
| 26 | BCG | 4.00 | 43.3 | 850 | OK | 23.7 | 270 | 31 |
| *18 | BCG | 2.55 | 25.0 | 920 | NG | *6.5 | 215 | 34 |

TABLE 4

| No | starting material particle diameter [μm] | crystal particle diameter [μm] | BaTiO₃ contents [mol] | $R^A$ oxide kind | $R^A$ oxide contents [mol] | $R^B$ oxide kind | $R^B$ oxide contents [mol] | MnO contents [mol] | MgO contents [mol] | V₂O₅ contents [mol] |
|---|---|---|---|---|---|---|---|---|---|---|
| *34 | 0.09 | 0.17 | 100 | Dy2 | 2.4 | Ho2 | 0.05 | 0.17 | 2.5 | 0.05 |
| 10 | 0.12 | 0.17 | 100 | Dy2 | 2.6 | Ho2 | 0.01 | 0.17 | 2.7 | 0.10 |
| 20 | 0.08 | 0.20 | 100 | Dy2 | 2.6 | Ho2 | 0.06 | 0.17 | 1.8 | 0.10 |
| 21 | 0.08 | 0.20 | 100 | Dy2 | 2.6 | Ho2 | 0.06 | 0.17 | 2.0 | 0.10 |
| 13 | 0.08 | 0.16 | 100 | Dy2 | 2.6 | Ho2 | 0.60 | 0.17 | 2.7 | 0.10 |
| 24 | 0.08 | 0.16 | 100 | Dy2 | 2.6 | Ho2 | 0.06 | 0.34 | 2.6 | 0.10 |
| 30 | 0.12 | 0.17 | 100 | Dy2 | 2.3 | Ho2 | 0.40 | 0.36 | 2.8 | 0.05 |
| 2 | 0.12 | 0.16 | 100 | Dy2 | 2.0 | Ho2 | 0.05 | 0.17 | 2.7 | 0.10 |
| 3 | 0.11 | 0.15 | 100 | Dy2 | 2.4 | Ho2 | 0.05 | 0.17 | 2.7 | 0.10 |
| 4 | 0.10 | 0.14 | 100 | Dy2 | 2.8 | Ho2 | 0.05 | 0.17 | 2.7 | 0.10 |
| 6 | 0.10 | 0.14 | 100 | Dy2 | 3.8 | Ho2 | 0.05 | 0.17 | 2.7 | 0.10 |
| 11 | 0.11 | 0.16 | 100 | Dy2 | 2.6 | Ho2 | 0.07 | 0.17 | 2.7 | 0.10 |
| 12 | 0.10 | 0.18 | 100 | Dy2 | 2.6 | Ho2 | 0.20 | 0.10 | 2.7 | 0.10 |
| 14 | 0.10 | 0.14 | 100 | Dy2 | 2.6 | Ho2 | 0.80 | 0.05 | 2.7 | 0.10 |
| 15 | 0.11 | 0.13 | 100 | Dy2 | 2.6 | Ho2 | 1.00 | 0.17 | 2.7 | 0.10 |
| 22 | 0.11 | 0.19 | 100 | Dy2 | 2.6 | Ho2 | 0.06 | 0.3 | 2.2 | 0.10 |
| 23 | 0.10 | 0.17 | 100 | Dy2 | 2.6 | Ho2 | 0.06 | 0.17 | 2.4 | 0.10 |
| 25 | 0.07 | 0.14 | 100 | Dy2 | 2.6 | Ho2 | 0.06 | 0.17 | 2.8 | 0.10 |
| 5 | 0.08 | 0.13 | 100 | Dy2 | 3.2 | Ho2 | 0.05 | 0.2 | 2.7 | 0.10 |
| 7 | 0.11 | 0.15 | 100 | Dy2 | 4.0 | Ho2 | 0.05 | 0.23 | 2.7 | 0.10 |
| 26 | 0.05 | 0.10 | 100 | Dy2 | 2.6 | Ho2 | 0.06 | 0.70 | 3.2 | 0.10 |

TABLE 4-continued

| *35 | 0.10 | 0.18 | 100 | Dy2 | 2.4 | Ho2 | 0.05 | 0.23 | 2.5 | 0.05 |
|---|---|---|---|---|---|---|---|---|---|---|

| | sintering aids | | | dielectric | temperature | highly ac-celerated | breakdown | |
|---|---|---|---|---|---|---|---|---|
| No | kind | contents [mol] | $R^A/R^B$ | constant ($\epsilon$ s) | characteristic (X7R) | lifetime [h] | voltage [V/μm] | electrostriction [ppm] |
| *34 | BCG | *0.80 | 48.0 | 800 | NG | *4.3 | 235 | 28 |
| 10 | BCG | 1.00 | 260.0 | 920 | OK | 25.0 | 230 | 34 |
| 20 | BCG | 2.00 | 43.3 | 1200 | OK | 20.2 | 210 | 49 |
| 21 | BCG | 2.00 | 43.3 | 1200 | OK | 21.5 | 210 | 49 |
| 13 | BCG | 2.30 | 4.3 | 885 | OK | 25.8 | 241 | 32 |
| 24 | BCG | 2.40 | 43.3 | 920 | OK | 32.3 | 241 | 34 |
| 30 | BCG | 2.4 | 5.8 | 1000 | OK | 25.8 | 251 | 38 |
| 2 | BCG | 2.5 | 40.0 | 1050 | OK | 28.0 | 262 | 41 |
| 3 | BCG | 2.55 | 48.0 | 900 | OK | 32.3 | 259 | 33 |
| 4 | BCG | 2.55 | 56.0 | 920 | OK | 30.1 | 251 | 34 |
| 6 | BCG | 2.55 | 76.0 | 880 | OK | 23.7 | 264 | 32 |
| 11 | BCG | 2.55 | 37.1 | 910 | OK | 28.0 | 241 | 34 |
| 12 | BCG | 2.55 | 13.0 | 900 | OK | 30.1 | 220 | 33 |
| 14 | BCG | 2.55 | 3.3 | 870 | OK | 28.0 | 251 | 32 |
| 15 | BCG | 2.55 | 2.6 | 860 | OK | 30.1 | 252 | 31 |
| 22 | BCG | 2.55 | 43.3 | 1150 | OK | 23.7 | 217 | 46 |
| 23 | BCG | 2.55 | 43.3 | 1000 | OK | 30.1 | 234 | 38 |
| 25 | BCG | 2.55 | 43.3 | 890 | OK | 25.8 | 261 | 33 |
| 5 | BCG | 2.7 | 64.0 | 900 | OK | 25.8 | 265 | 33 |
| 7 | BCG | 3 | 80.0 | 850 | OK | 21.5 | 260 | 31 |
| 26 | BCG | 4.00 | 43.3 | 850 | OK | 23.7 | 270 | 31 |
| *35 | BCG | *5.00 | 48.0 | 700 | NG | *8.6 | 220 | 23 |

Effect of $R^A$ Oxide (Sample 1 to Sample 8, Sample 38, Sample 39)

In Table 1, $R^A$ is Dy in sample 2 to sample 7, of course the contents of $Dy_2O_3$, the crystal particle size, the contents of $R^B$ oxide, the value of $R^A/R^B$, the contents of MnO, the contents of MgO, the contents of $V_2O_5$ and the contents of sintering aids were within the range of the present invention. These samples 2 to 7 showed excellent values of the capacitance-temperature characteristic and the highly accelerated lifetime compared to the case in which the contents of $Dy_2O_3$ was out of the range of the present invention (sample 1 and sample 8).

Also, the specific dielectric constant and the electrostriction tend to be lower, when the contents of $Dy_2O_3$ is larger.

Further, from Table 1 and Table 2, it is noted, when $R^A$ was Tb or Gd instead of Dy, the effects similar to Dy can be obtained (sample 38, and sample 39).

Effect of $R^B$ Oxide (Samples 9 to 16, Sample 40, Sample 41)

In Table 1, RB was Ho in sample 10 to sample 15, of course the contents of $Ho_2O_3$, the crystal particle size, the contents of $R^A$ oxide, the value of $R^A/R^B$, the contents of MnO, the contents of MgO, the contents of $V_2O_5$ and the contents of sintering aids were within the range of the present invention. These samples 10 to sample 15 showed excellent values of the capacitance-temperature characteristic and the highly accelerated lifetime compared to the sample 9 and sample 16 in which the contents of $Ho_2O_3$ and the value of $R^A/R^B$ were out of the range of the present invention.

Also, the specific dielectric constant and the electrostriction tend to be lower, when contents of $Ho_2O_3$ was larger.

Further, from sample 40 and sample 41, it is noted, when $R^B$ was Y or Yb instead of Ho, effects similar to Ho can be obtained.

Effects of MnO (Table 3)

Samples described in Table 3 were, except for sample 17 and sample 18, of course contents of MnO, the crystal particle size, the contents of $R^A$ oxide, the contents of $R^B$ oxide, the value of $R^A/R^B$, the contents of MgO, the contents of $V_2O_5$ and the contents of sintering aids were within the range of the present invention. These samples 20 to 26 showed excellent values of the capacitance-temperature characteristic and the highly accelerated lifetime compared to sample 17 and sample 18 in which the content of MnO was out of the range of the present invention.

Effects of MgO (Sample 19 to Sample 27)

In Table 1, in samples 20 to 26, of course the contents of MgO, the crystal particle size, the contents of $R^A$ oxide, the contents of $R^B$ oxide, the value of $R^A/R^B$, the contents of MnO, the contents of $V_2O_5$, and the contents of sintering aids were within the range of the present invention. These sample 20 to sample 26 showed excellent values of the capacitance-temperature characteristic and the highly accelerated lifetime compared to the sample 19 and 27 in which the contents of MgO was out of the range.

Also, the specific dielectric constant and the electrostriction tend to be lower, when contents of MgO was larger.

Effects of $V_2O_5$ (Sample 28 to Sample 33)

In Table 1, in samples 29 to 32, of course the contents of $V_2O_5$, the crystal particle size, the contents of $R^A$ oxide, the contents of $R^B$ oxide, the value of $R^A/R^B$, the contents of MnO, the contents of MgO, and the contents of sintering aids were within the range of the present invention. These sample 29 to sample 32 showed excellent values of the capacitance-temperature characteristic and the highly accelerated lifetime compared to the case that the contents of $V_2O_5$ was out of the range of the present invention (sample 28 and sample 33).

Also, the specific dielectric constant and the electrostriction tend to be lower, when the contents of $V_2O_5$ was larger.

Effects of Sintering Aids (Table 4, Sample 36 and Sample 37)

In samples described in Table 4, the sintering aids was $(Ba_{0.6}Ca_{0.4})SiO_3$, except for sample 34 and sample 36, of course the contents of $(Ba_{0.6}Ca_{0.4})SiO_3$, the crystal particle size, the contents of $R^A$ oxide, the contents of $R^B$ oxide, the value of $R^A/R^B$, the contents of MnO, the contents of MgO and the contents of $V_2O_5$ were within the range of the present invention, and showed excellent values of the capacitance-temperature characteristic and the highly accelerated lifetime compared to the case that the contents of sintering aids was out of range of the present invention (sample 34 and sample 35).

Also, although in case that sintering aids was $SiO_2$ (sample 36) instead of $(Ba_{0.6}Ca_{0.4})SiO_3$, similar effect can be obtained. However when $Li_2O$ (sample 37) was used, the capacitance-temperature characteristics did not satisfy X7R property which was a reference of the capacitance-temperature characteristics of the present invention. Further, the highly accelerated lifetime tends to be lowered and did not satisfy 20 hours or longer which was a reference of the highly accelerated lifetime of the present invention.

Effects of Crystal Particle Size

With respect to sample 19, sample 42 and sample 43, in case the crystal particle size was out of range of the present invention, the highly accelerated lifetime tends to be lowered.

In case the crystal particle size was larger than the range of the present invention (sample 19 and sample 42), the electrostriction tends to deteriorate. In case that the crystal particle size was smaller than the range of the present invention (sample 43), the temperature changing rate of capacitance and the highly accelerated lifetime tend to deteriorate.

The invention claimed is:

1. A dielectric ceramic composition comprising:
a main component including barium titanate;
a first subcomponent including MgO;
a second subcomponent including sintering aids of $(Ba,Ca)_xSiO_{2+x}$, where x is from 0.8 to 1.2;
a third subcomponent including $V_2O_5$;
a fourth A subcomponent including $R^A$ oxide, where $R^A$ is at least one selected from Tb and Dy;
a fourth B subcomponent including $R^B$ oxide, where $R^B$ is at least one selected from Ho, Y, and Yb; and
a fifth subcomponent including MnO,
wherein:
a ratio of the respective subcomponents to 100 mol of said main component is:
the first subcomponent: 2.2 to 2.8 mol,
the second subcomponent: 2.4 to 2.55 mol,
the third subcomponent: 0.05 to 0.10 mol,
the fourth A subcomponent: 2.3 to 2.8 mol,
the fourth B subcomponent: 0.05 to 0.5 mol, and
the fifth subcomponent: 0.1 to 0.4 mol,
the mol ratio of said $R^A$ oxide to $R^B$ oxide is shown by $R^A/R^B$, $R^A/R^B$ is 5.8 to 56, and
an average crystal particle size after firing is 0.1 to 0.2 μm.

2. An electronic component comprising;
a dielectric layer composed of dielectric ceramic composition as set forth in claim 1, and
an internal electrode layer.

* * * * *